United States Patent
Awfi

(10) Patent No.: US 11,754,737 B2
(45) Date of Patent: Sep. 12, 2023

(54) SYSTEM AND METHOD FOR QUANTITATIVE QUALITY ASSESSMENT OF SEISMIC SURFACES

(71) Applicant: Saudi Arabian Oil Company, Dhahran (SA)

(72) Inventor: Sami N. Awfi, Dammam (SA)

(73) Assignee: Saudi Arabian Oil Company, Dhahran (SA)

(*) Notice: Subject to any disclaimer, the term of this patent is extended or adjusted under 35 U.S.C. 154(b) by 164 days.

(21) Appl. No.: 17/197,558

(22) Filed: Mar. 10, 2021

(65) Prior Publication Data
US 2022/0291408 A1    Sep. 15, 2022

(51) Int. Cl.
*G01V 1/30* (2006.01)
*G01V 1/36* (2006.01)

(52) U.S. Cl.
CPC .............. *G01V 1/307* (2013.01); *G01V 1/36* (2013.01); *G01V 2210/23* (2013.01)

(58) Field of Classification Search
CPC ....... G01V 1/307; G01V 1/36; G01V 2210/23
See application file for complete search history.

(56) References Cited

U.S. PATENT DOCUMENTS

| | | | |
|---|---|---|---|
| 6,049,760 A * | 4/2000 | Scott ................... | G01V 1/28 702/14 |
| 7,184,991 B1 * | 2/2007 | Wentland ............ | G06V 10/40 706/14 |
| 7,519,476 B1 | 4/2009 | Tnacheri et al. | |
| 2010/0161232 A1 * | 6/2010 | Chen .................... | G01V 1/345 702/16 |
| 2012/0090834 A1 | 4/2012 | Imhof et al. | |
| 2012/0150447 A1 | 6/2012 | Van Hoek et al. | |
| 2013/0286782 A1 * | 10/2013 | Vyas .................... | G01V 1/282 367/73 |
| 2013/0338927 A1 | 12/2013 | Kumaran | |
| 2016/0377753 A1 | 12/2016 | Paiva et al. | |
| 2018/0003839 A1 | 1/2018 | Lowell et al. | |

(Continued)

FOREIGN PATENT DOCUMENTS

| | | | |
|---|---|---|---|
| EP | 0846276 | 2/2001 | |
| EP | 846276 B1 * | 2/2001 | ............ G01V 1/28 |

OTHER PUBLICATIONS

Brown, "Seismic attributes and their classification," Interpreter's Corner, The Leading Edge, Oct. 1996, 1 page.

(Continued)

*Primary Examiner* — Raymond L Nimox
(74) *Attorney, Agent, or Firm* — Fish & Richardson P.C.

(57) ABSTRACT

Some implementations of the present disclosure provide a method that include: accessing a set of seismic traces from a grid of locations inside an geo-exploration area, each seismic trace records seismic reflections from underneath the geo-exploration area at a location of the grid; accessing an input indicating a surface in the set of seismic traces; extracting a plurality of wavelets from the set of seismic traces, each wavelet covering an adjustable length around the surface; determining a reference wavelet for each wavelet of a corresponding adjustable length; and quantifying a quality of the surface based on correlating the plurality of wavelets with each reference wavelet of the corresponding adjustable length.

15 Claims, 10 Drawing Sheets

(56) References Cited

U.S. PATENT DOCUMENTS

| | | |
|---|---|---|
| 2018/0031732 A1 | 2/2018 | Mosse et al. |
| 2018/0052249 A1 | 2/2018 | Chen et al. |
| 2018/0113235 A1 | 4/2018 | Laverne |
| 2018/0156937 A1 | 6/2018 | Wyatt et al. |
| 2019/0383965 A1* | 12/2019 | Salman ............... G01V 11/00 |
| 2020/0257011 A1 | 8/2020 | Awfi |

OTHER PUBLICATIONS

Chopra and Marfurt, "75th Anniversary, Seismic attributes—A historical perspective," Geophysics, Sep.-Oct. 2005, 70:5 (3SO-28SO), 26 pages.

Chopra and Marfurt, "Emerging and future trends in seismic attributes," The Leading Edge, Mar. 2008, 16 pages.

Dirstein et al., "Insights from the automated extraction of surfaces from the bunda 3D seismic survey," West Australian Basins Symposium, Aug. 18, 2013, 21 pages.

Gramstad et al., "Seismic surface extraction using iterative Seismic DNA detection," SEG Las Vegas 2012 Annual Meeting, 2012, 5 pages.

Hoyes and Cheret, "A review of global interpretation methods for automated 3D horizon picking," Special Section: Reservoir Characterization, The Leading Edge, Jan. 2011, 8 pages.

Pauget et al., "A Global Approach in Seismic Interpretation Based on Cost Function Minimization," SEG Houston 2009 International Exposition and Annual Meeting, 2009, 5 pages.

Yan and Wu, "Seismic horizon refinement with dynamic programming," SEG International Exposition and 90th Annual Meeting, Society of Exploration Geophysicists, 2020, 5 pages.

PCT International Search Report and Written Opinion in International Appln. No. PCT/US2022/019455, dated May 30, 2022, 14 pages.

* cited by examiner

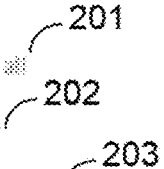

Function: Assess_Maximum_Quality
Inputs: seismic cube, surface
output: quality measure (0 to 100%), Best window (in samples)

```
Maximum_search←20  // set max search window, see text for explanation
half_window←1      // for first iteration half window is 1
maximum_quality←0  // set maximum quality so far to zero
best_window←2 * half_window + 1 // window at which best quality occurs, this is the initial value Loop until half_window > Maximum_search
    wL←2 * half_window + 1         // size of each wavelets in samples
    Wavelets[X,Y,wL]←extract_wavelets(cube,surface,half_window) // extract all
    wavelets of this size
    Reference[wL]←compute_reference_wavelet(Wavelets[X,Y,wL]) // compute
    reference wavelet
    current_quality←compute_quality(Wavelets[X,Y,wL],Reference[wL]) // compute
    current quality
    if (current_quality) > (Maximum_quality)
        maximum_quality←current_quality
        best_window←2 * half_window + 1
    end if
    half_window←half_window + 1
end loop return maximum_quality, best_window // save and return the maximum quality and the window
length at which it occurs
```

FIG. 2A

Function: compute_reference_wavelet
Input: wavelets[X,Y,wL]
output: Reference[wL]

```
referenceWavelet[wL] ← 0   // initialize all samples in reference wavelet to zero
for each Y location
    for each X location                                              ⎯210
        for sample = 0 to wL
            referenceWavelet[sample] ← referenceWavelet[sample]
                + wavelets[x,y,sample]
        end for
    end for
end for
waveletsCount ← X * Y   // wavelets count is total Y locations times total X locations
for sample = 0 to wL
    referenceWavelet[sample] ← referenceWavelet[sample]/waveletsCount
end for
return referenceWavelet
```

FIG. 2B

Function compute_quality
input: wavelets[X,Y,wL], reference[wL]
Output: Quality (0 to 100%)

```
Qs ← 0
Rs ← 0
for sample 0 to wL
        Rs ← Rs + (reference[sample])²
end for
for each Y location
    for each X location                           ⎯220
        Ws ← 0
        nR ← 0
        for sample 1 to wL
            nR ← nR + (wavelet[x,y,sample])(referenceWavelet[sample])
            Ws ← Ws + (wavelet[x,y,sample])²
        end for
        nR ← nR / √((Ws)(Rs))
        Qs ← Qs + nR
    end for
end for
Qs ← (100 × Qs) / (X × Y)
return Qs
```

SYSTEM AND METHOD FOR QUANTITATIVE QUALITY ASSESSMENT OF SEISMIC SURFACES

TECHNICAL FIELD

This disclosure generally relates to quality assessment of seismic surfaces in the context of geo-exploration for oil and gas.

BACKGROUND

Seismic data are often collected from geo-explorations operations. Such seismic data often form the basis for structural and stratigraphic interpretation and various other quantitative and qualitative studies with the goal of understanding the subsurface underneath the earth.

SUMMARY

In one aspect, some implementations provide a computer-implemented method, that includes: accessing a set of seismic traces from a grid of locations inside an geo-exploration area, each seismic trace records seismic reflections from underneath the geo-exploration area at a location of the grid; accessing an input indicating a surface in the set of seismic traces; extracting a plurality of wavelets from the set of seismic traces, each wavelet covering an variable length around the surface; determining a reference wavelet for each wavelet of a corresponding variable length; and quantifying a quality of the surface based on correlating the plurality of wavelets with each reference wavelet of the corresponding variable length.

Implementations may include one or more of the following features.

Quantifying a quality of the surface may include: for each variable length, computing a cross-correlation between the plurality of wavelets and each reference wavelet; and determining the quality of the surface based on selecting a representative value from cross-correlations computed for a range of variable lengths. Selecting a representative value comprises: selecting a maximum of the cross-correlations computed for the range of variable lengths. The method may further include: identifying a size of the variable length where the representative value occurs. The method may further include: adjusting the variable length between a lower limit and an upper limit while quantifying the quality of the surface, wherein the identified size of the variable length is within the lower limit and the upper limit.

The input may indicate more than one surfaces in the set of seismic traces. The method may further include: quantifying a respective quality of each of the more than one surfaces; and ranking the more than one surfaces based on the respective quality of each of the more than one surfaces. The method may further include: based on the ranked more than one surfaces, providing a feedback to a selection process for the more than one surfaces such that the selection process can be iteratively improved based on the feedback, wherein the selection process includes at least one of: an artificial intelligence (AI) algorithm, a machine learning (ML) algorithm, or a dynamic programming algorithm.

In another aspect, some implementations provide a computer system comprising one or more computer processors configured to perform operations of: accessing a set of seismic traces from a grid of locations inside an geo-exploration area, each seismic trace records seismic reflections from underneath the geo-exploration area at a location of the grid; accessing an input indicating a surface in the set of seismic traces; extracting a plurality of wavelets from the set of seismic traces, each wavelet covering an variable length around the surface; determining a reference wavelet for each wavelet of a corresponding variable length; and quantifying a quality of the surface based on correlating the plurality of wavelets with each reference wavelet of the corresponding variable length.

Implementations may include one or more of the following features.

Quantifying a quality of the surface may include: for each variable length, computing a cross-correlation between the plurality of wavelets and each reference wavelet; and determining the quality of the surface based on selecting a representative value from cross-correlations computed for a range of variable lengths. Selecting a representative value comprises: selecting a maximum of the cross-correlations computed for the range of variable lengths. The operations may further include: identifying a size of the variable length where the representative value occurs. The operations may further include: adjusting the variable length between a lower limit and an upper limit while quantifying the quality of the surface, wherein the identified size of the variable length is within the lower limit and the upper limit.

The input may indicate more than one surfaces in the set of seismic traces. The operations may further include: quantifying a respective quality of each of the more than one surfaces; and ranking the more than one surfaces based on the respective quality of each of the more than one surfaces. The operations may further include: based on the ranked more than one surfaces, providing a feedback to a selection process for the more than one surfaces such that the selection process can be iteratively improved based on the feedback, wherein the selection process includes at least one of: an artificial intelligence (AI) algorithm, a machine learning (ML) algorithm, or a dynamic programming algorithm.

In yet another aspect, some implementations provide a computer-readable medium comprising software instructions, which software instructions, when executed by a computer processor, causes the computer processor to perform operations of: accessing a set of seismic traces from a grid of locations inside an geo-exploration area, each seismic trace records seismic reflections from underneath the geo-exploration area at a location of the grid; accessing an input indicating a surface in the set of seismic traces; extracting a plurality of wavelets from the set of seismic traces, each wavelet covering an variable length around the surface; determining a reference wavelet for each wavelet of a corresponding variable length; and quantifying a quality of the surface based on correlating the plurality of wavelets with each reference wavelet of the corresponding variable length.

Implementations may include one or more of the following features.

Quantifying a quality of the surface may include: for each variable length, computing a cross-correlation between the plurality of wavelets and each reference wavelet; and determining the quality of the surface based on selecting a representative value from cross-correlations computed for a range of variable lengths. Selecting a representative value comprises: selecting a maximum of the cross-correlations computed for the range of variable lengths. The operations may further include: identifying a size of the variable length where the representative value occurs. The operations may further include: adjusting the variable length between a lower limit and an upper limit while quantifying the quality of the surface, wherein the identified size of the variable length is within the lower limit and the upper limit.

The input may indicate more than one surfaces in the set of seismic traces. The operations may further include: quantifying a respective quality of each of the more than one surfaces; and ranking the more than one surfaces based on the respective quality of each of the more than one surfaces. The operations may further include: based on the ranked more than one surfaces, providing a feedback to a selection process for the more than one surfaces such that the selection process can be iteratively improved based on the feedback, wherein the selection process includes at least one of: an artificial intelligence (AI) algorithm, a machine learning (ML) algorithm, or a dynamic programming algorithm.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

FIGS. 2A to 2C are examples of pseudo-codes for some implementations of the present disclosure.

Like reference numbers and designations in the various drawings indicate like elements.

DETAILED DESCRIPTION

Figure 1:
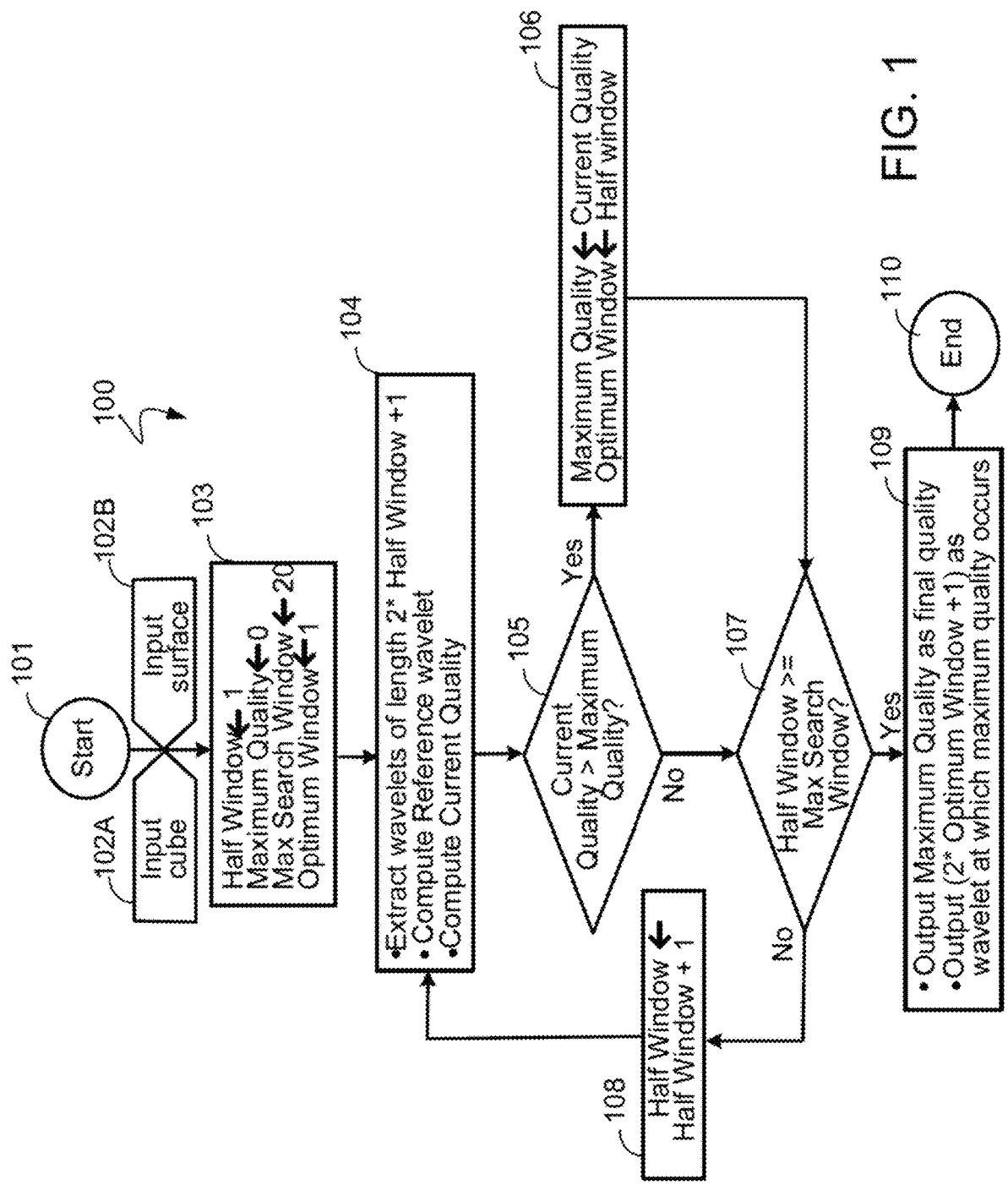
FIG. 1 is an example of a workflow diagram according to an implementation of the present disclosure.

During geo-exploration of a site, seismic traces are obtained by probing the earth's interior by using acoustic input shots, and recording the reflection acoustic signals. In many case, the reflection variation map can be constructed based on the seismic traces. Successful reconstruction and quantification may enable the characterization of the depositional features at a specified target formation or depth. In this context, the first step of seismic data analysis is picking surfaces, also known as horizons, from the seismic traces. The surfaces may then be used as reference points for structural and stratigraphic interpretation of the recorded seismic traces. Such interpretation may enable various quantitative and qualitative studies of the subsurface, which can form the basis for subsequent decision-making for drilling. Solid analysis can reduce drilling risks and improve potential gains from drilling.

For various reasons, in today's practice, surfaces in seismic traces may not necessarily follow consistent seismic event everywhere in the recorded data. For example, the seismic traces may not be trackable everywhere because of noise in the recorded seismic traces, inadequate signal processing, or lack of geological contrast. In other cases, the surface may be generated by interpolating (also known as kriging) sparsely separated at points (e.g., wells) or lines (e.g., individual seismic 2D lines where the surface is manually picked) to fill a large region. In these cases, the surface may not follow the seismic response between these sparsely picked points because the seismic response is not taken into consideration between these points or lines. Additionally, the surface may have been generated from another seismic cube and when a new processing of the same cube becomes available, the surface may not fit the newly processed cube. The surface could may also have been generated from another reference surface above or below by copying and shifting the reference surface. In this case, the two surfaces can be assumed as exactly conformal (or parallel). In this case, a shifted surface will not fit the seismic in the new location (e.g., a different geological age).

Various implementations of the present disclosure can quantify a surface quality using one global score and accomplish this quantification automatically using computer implementations. The capabilities are significant with respect to the ability to measure quality globally and the ability to perform measurement automatically and without human supervision. In contrast, conventional approaches rely on manual quality check including manual visual inspection of the seismic trances in 3D or several 2D planes. These conventional processes are highly subject to human variation. In the absence of a defined surface quality, various implementations of the present disclosure can accomplish automatic quantification of surface quality and thus allow surface quality assessment to be incorporated in iterative optimization algorithms to enhance the surface interpretation. The implementations may achieve a single global score for quantifying the quality of a given surface.

The terminology used in the present disclosure includes the following terms.

The term "surface" can be used interchangeably with "horizon." The term refers to an imaginary surface or layer in the subsurface of the earth, usually thought of as representing a stratigraphic surface (either lithostratigraphic or chronostratigraphic). For example, geoscientists often consider seismic horizons as geological horizons, or even as strata surfaces.

The term "seismic cube" often refers to a collection of seismic data covering a three-dimensional (3D) volume. For example, the collection of seismic data include a collection of seismic data traces from a grid of points over a two-dimensional (2D) area. Each data trace may represent reflection amplitudes from the depth direction at a particular point of the grid.

The term "machine learning analytics" refers to the use of machine learning and applied statistics to predict unknown conditions based on the available data. Two general areas that fall under machine learning analytics are classification and regression. While classification refers to the prediction of categorical values, regression connotes the prediction of continuous numerical values. One machine learning implementation is also known as "supervised learning" where the "correct" target or y values are available. For illustration, the goal of some implementations is to learn from the available data to predict the unknown values with some defined error metrics. In supervised learning, for example, there are a set of known predictors (features) $x_1, x_2, \ldots, x_m$ which are known to the system as well as the target values $y_1, y_2, \ldots, y_n$, which are to be inferred. The system's objective is to train a machine learning model to predict new target values $y_1, y_2, \ldots, y_n$ by observing new features.

The implementations can employ a variety of machine learning algorithms. For classification, examples of prediction algorithms can include, logistic regression, decision trees, nearest neighbor, support vector machines, K-means clustering, boosting, and neural networks. For regression, examples of predication algorithms can include least squares regression, Lasso, and others. The performance of an algorithm can depend on a number factors, such as the selected set of features, training/validation method and hyper-parameters tuning. As such, machine learning analytics can manifest as an iterative approach of knowledge finding that includes trial and error. An iterative approach can iteratively modify data preprocessing and model parameters until the result achieves the desired properties.

Referring to FIG. 1, a workflow diagram 100 is shown as an example. The workflow may initially access an input cube 102A and an input surface 102B. Input cube 102A may represent a seismic cube that includes a set of seismic data traces gathered from a grid of points over an area. Input surface 102B may be a picked surface representing a stratigraphic surface in the seismic cube. The surface picking can be performed manually, or by an algorithm.

In 103, the workflow may initialize several parameters for the subsequent calculations. These parameters include: a half window size, a maximal quality, a maximal search window size, and an optimal window. As illustrated, the half window size is initialized as 1, the maximal quality is initialized as 0, the maximal search window size is initialized as 20, and the optimal window size is initialized as 1, As illustrated, the maximum search window size is set to 20 samples, which means a maximum window of 41 samples. In case of seismic data with a sampling rate of 4 millisecond, this maximum search window size represents a temporal duration of 164 ms. In most cases, this temporal duration can be at least one wavelength of source wavelet. In most seismic data, one wavelength may be typically around 128 ms, which corresponds to half window of 16 samples. Of course, a judicious choice can depend on the wavelength of the seismic wave. That said the half window can be larger and usually may not have any effect on results as long as it is bigger than the source wavelet. However, when this number is too large compared to the source wavelet, the running time will be longer by virtue of incurring unnecessary computation. Indeed, the optimum quality may be usually found with a length close to the source wavelet length and the output may not change with more iterations. To reduce computation time and improve responsiveness, a limit as a number of samples can be implemented in some implementations of the present disclosure.

Once the parameters are initialized, the work flow may proceed to extract wavelets from the input cube 102A, compute a reference wavelet, and compute a current quality (104). As illustrated and further referring to FIG. 2A, each wavelet may be covering an adjustable length of 2×half window+1. Further referring to FIG. 3, an example 300 illustrates how the wavelets are extracted around the picked surface in some implementations of the present disclosure. As illustrated, seismic section 301 may represent a 2D cross-section of a 3D seismic cube. In this illustration, a population of wavelets 302 are extracted from the seismic section 301. As illustrated, the population of wavelets are centered at the picked surface 304 and extends a number of samples (303A) above the picked surface and a number of samples (303B) below the picked surface. In various implementations, the number of samples can be equal to the half window size.

The workflow may execute a loop, until the half window size reaches the maximal search window size, to extract all wavelets of the adjustable length from the seismic cube (201), compute the reference wavelet (202), and compute the current quality (203). Further referring to FIG. 2B, the workflow may computer the reference wavelet as an average of all wavelets within the 2D grid (210). While FIG. 2B illustrates an implementation to calculate a statistical average (or mean), other implementations can be used. For example, implementations may calculate a reference wavelet as the median of the population of wavelets instead of the mean. When the median is chosen, then the result is expected to be similar in terms of providing a quality of the surface. While the median and mean implementations can generate results that are identical or very close when the distribution of wavelets is normal or close to normal, the median can be advantageous over the mean when faced with a few anomalies (also known as outliers) in the seismic data especially when these anomalies are artifacts during data acquisition or processing and thus are unwanted for deviating from the true earth. In these cases, the median can be better because the median is not as sensitive to anomalies as the mean. Computing the median, however, can be more time consuming than computing the mean especially for large datasets. In addition, for large number of points, the anomalies may have less effect on the mean and the median can be less advantageous and more computationally intensive for these datasets.

Further referring to FIG. 2C, the work flow may then determine the current quality as cross-correlation of all extracted wavelets from the 2D grid and the reference wavelet (220). The workflow may then determine whether current quality is greater than the parameter of maximal quality (105). If the determination is yes, the workflow may proceed to change maximal quality to current quality and change optimal window size to current size, which is half window (106). These updates are also reflected in block 204 of FIG. 2A. If the determination is no, the workflow proceeds to further determining whether the half window is greater than or equal to the maximal search window size (107). If the determination is no, the workflow proceeds to increment the half window parameter by 1 (108) and then continues the loop (104). If the determination is that half window has reached the maximal search window size, the workflow proceeds to output the maximal quality as the final quality and output the window size at which the maximal quality occurs for the wavelets (109). The current window size is the current value of 2×half window+1. The workflow may then terminate (110). In some implementations, the loop that computes quality in FIG. 2A to continue the quality computation as long as the quality is still improving. In other words, the loop can stop once quality start decreasing. This loop design could be much faster than the loop illustrated in FIG. 2A, although the results can be very close. In this case, however, the result will not necessarily be the maximum quality possible but a local quality maximum.

Figure 4:
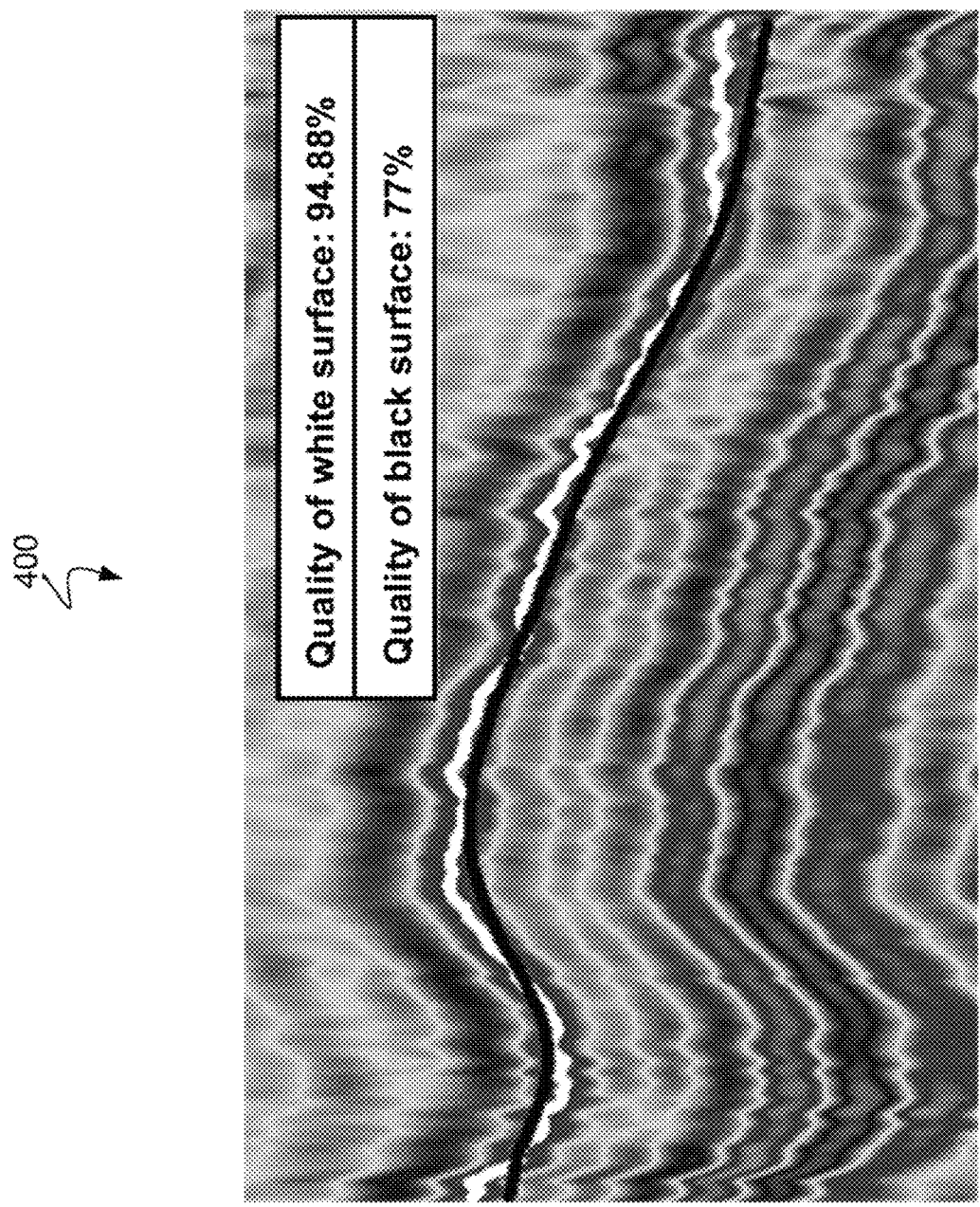
FIG. 4 shows examples of quality metrics calculated from picked surfaces in the seismic data according to some implementations of the present disclosure.

FIG. 4 shows examples of quality metrics calculated from picked surfaces in the seismic data according to some implementations of the present disclosure. As illustrated, the quality of the picked surface in white is determined as 94.88% while the quality of the picked surface in black is determined as 77%. The quality assessments indicate the white surface is more consistent with the seismic than the black surface, as revealed visually when both surfaces are displayed together on the same seismic section in FIG. 4. Here, the white surface follows the seismic reflection more accurately than the black surface does, which means the white surface is more consistent with the seismic than the black surface and hence has higher quality than the black surface. The reason for the quality difference is the way these surfaces are generated. Here, the white surface is generated by auto-tracking the seismic event for every location. The black surface is generated by interpolating based on point data available for same location. In other words, the white is generated by tracking the seismic cube at every location with a program while black surface is generated based on interpolation of sparse points that do not cover every trace. For this reason, the black surface does not follow the seismic at every point. FIG. 4 thus highlights the capability of the proposed algorithm to correctly and consistently identify the white surface is more consistent with seismic than the black surface. Additionally, the proposed algorithm can provide a quantitate measure of the consistency or quality.

Notably, the quality score assumes the picked surface is reasonably smooth and geologically sensible compared to the grid spacing; upon which the surface is defined. A surface that jumps up and down 100 ft (or several tens of milliseconds between adjacent traces) is not geologically sensible. The only geologically sensible large jumps in this case would be where faults are located. However, these points are relatively rare and do not invalidate the geological sensibility. Indeed, in most cases, if the surface is noisy and not smooth, the surface can be easily filtered before quality is even computed.

Figure 5:
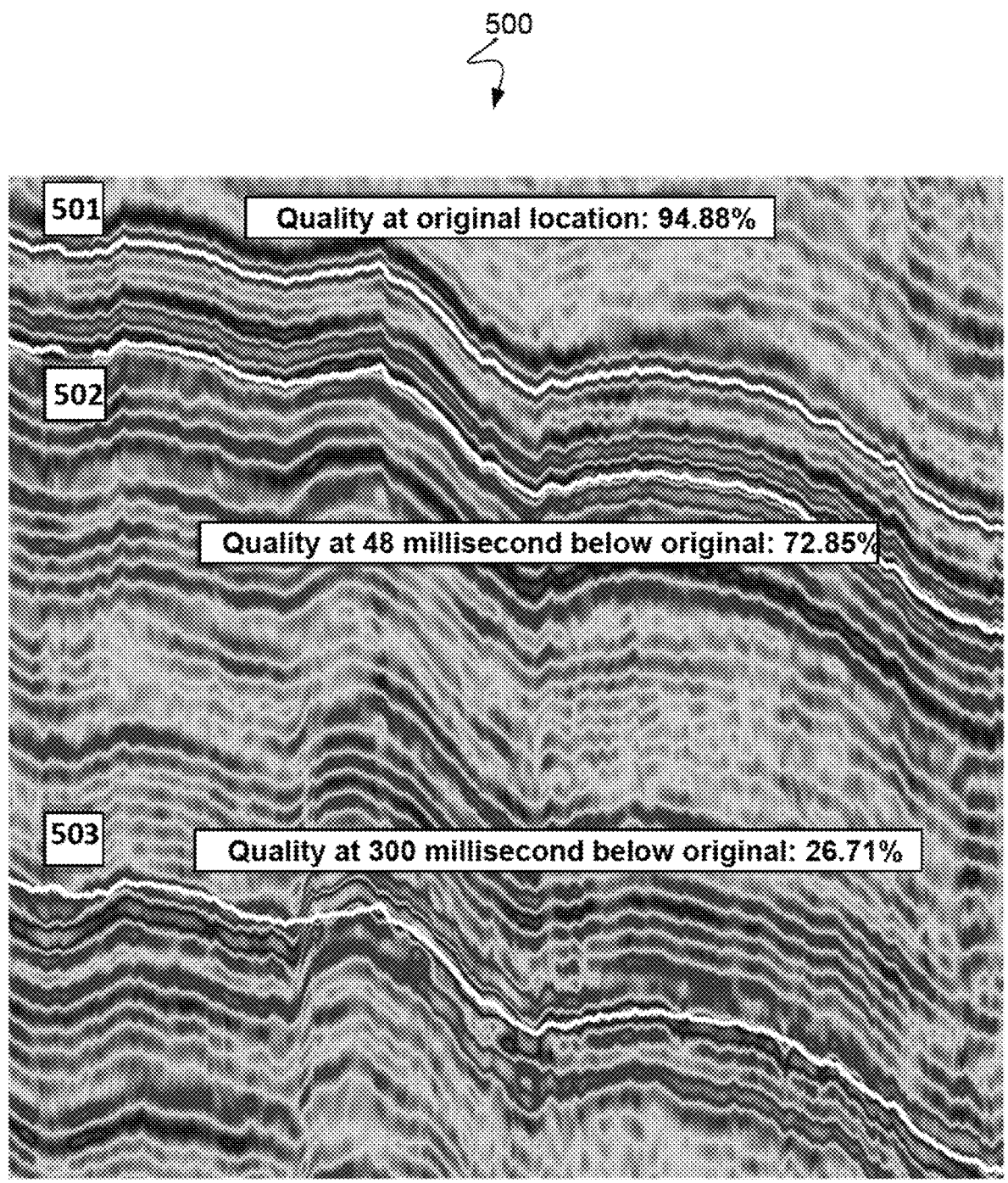
FIG. 5 shows additional examples of quality metrics calculated from picked surfaces in the seismic data according to some implementations of the present disclosure.

FIG. 5 shows additional examples quality metrics calculated from picked surfaces in the seismic data according to some implementations of the present disclosure. These examples illustrate the conformity assumption. As illustrated, the surface is originally picked at location 501 where the quality score is 94.88%. When the surface is shifted as is downward 48 milliseconds to location 502. At this location 502, the surface has quality score of 72.85%. Thereafter, the surface is further shifted 300 ms below the original location 501 to location 503, where the quality score becomes 26.71%. The results indicate that location 502 is somewhat conformal to original location 501, but location 503 is not. Such is the case in reality. This example is given to show how the implementations of the present disclosure can be used to test and quantify the conformity of different reflections on the seismic. If the seismic reflections are conformal (parallel), then moving the surface up and down will not change the quality significantly since the surface will still fit a new reflection event if that reflection is parallel to the original on which the surface was picked. However, shifting the surface with a constant amount will not make the surface fit the seismic if the current reflection event is not parallel to the original event where the surface was originally picked. Moreover, the implementations can quantify the degree of conformity between two reflections on the seismic. The less conformal the layers are, the bigger the drop in quality when moving the surface away from its original location, as revealed by FIG. 5. Geologically speaking, conformity of two surfaces is significant to understand the history and geology of the area. Normally the layers are deposited on top of each other and should be conformal on short time scales. However, on the scale of geologic time (or eon), events will happen that change this conformity. If two layers are not conformal, this indicates various geological activities happening between the time the older layer is deposited and the time the new layer is deposited. Unconformity, for example, can indicate variable lateral deposition rate, erosion events, tectonic activities and other geological events. In general, the closer the layers in time the more conformal the layers will be and the more distant in time the less conformal they will be. However, conformity will change much faster if there are more geological activities happening between the two layers, as explained above. For this reason, conformity can be a very good interpretive tool and good indicator of past geological activities. Implementations of the present disclosure can test and quantify the degree of conformity which used to be hard or infeasible to quantify manually.

Figure 6:
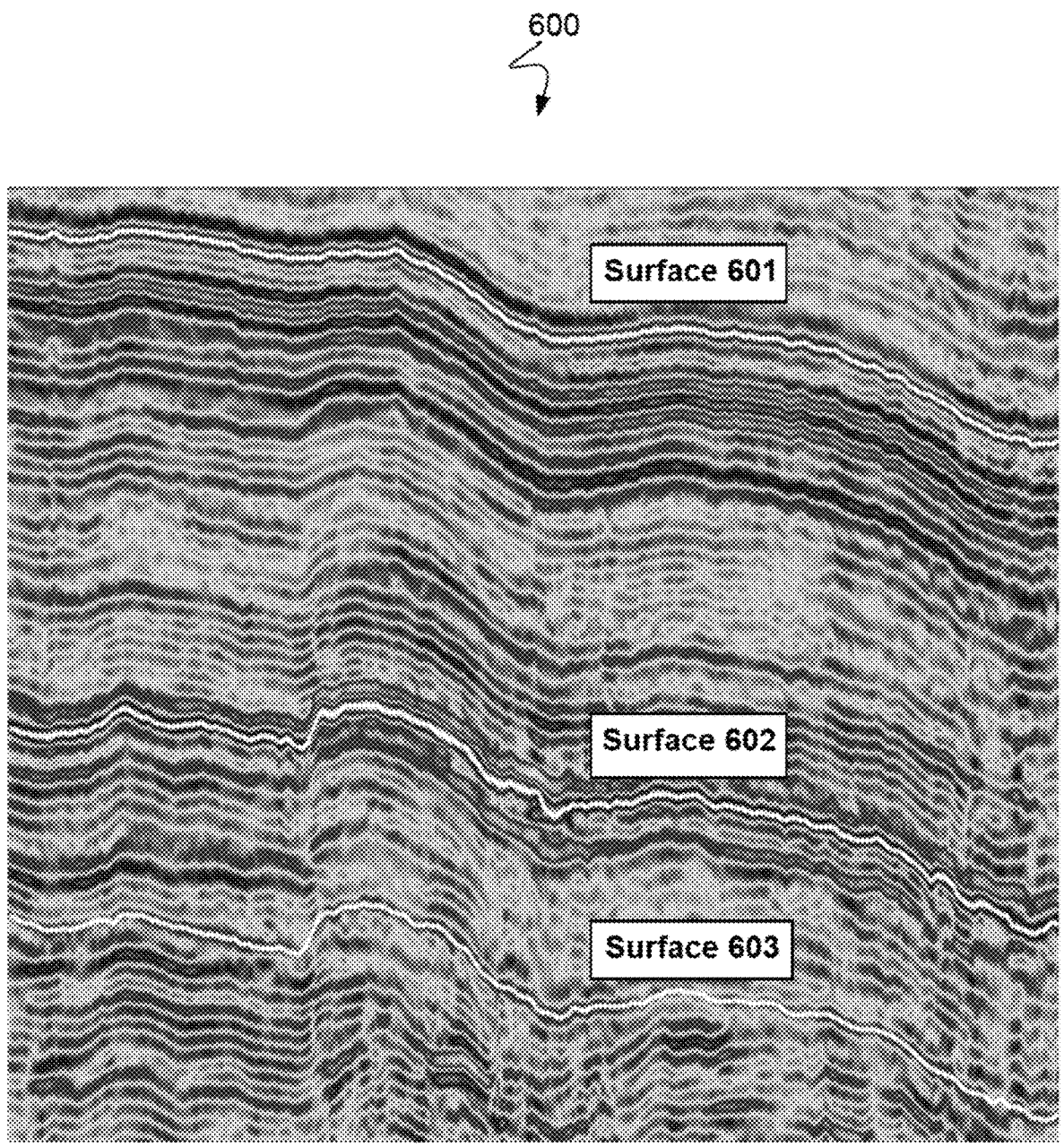
FIG. 6 shows more examples of quality metrics calculated from picked surfaces in the seismic data according to some implementations of the present disclosure.

FIG. 6 shows more examples of quality metrics calculated from picked surfaces in the seismic data according to some implementations of the present disclosure. Specifically, quality scores are computed for the illustrated surfaces 601, 602, and 603, and the results are shown in Table 1 below. Indeed, the implementations can include software programs which can be executed programmatically to score all the surfaces in the seismic data of a database for data management purposes.

| Surface ID | Quality Score |
| --- | --- |
| 601 | 94.88% |
| 602 | 96.35% |
| 603 | 85.13% |

Figure 7:
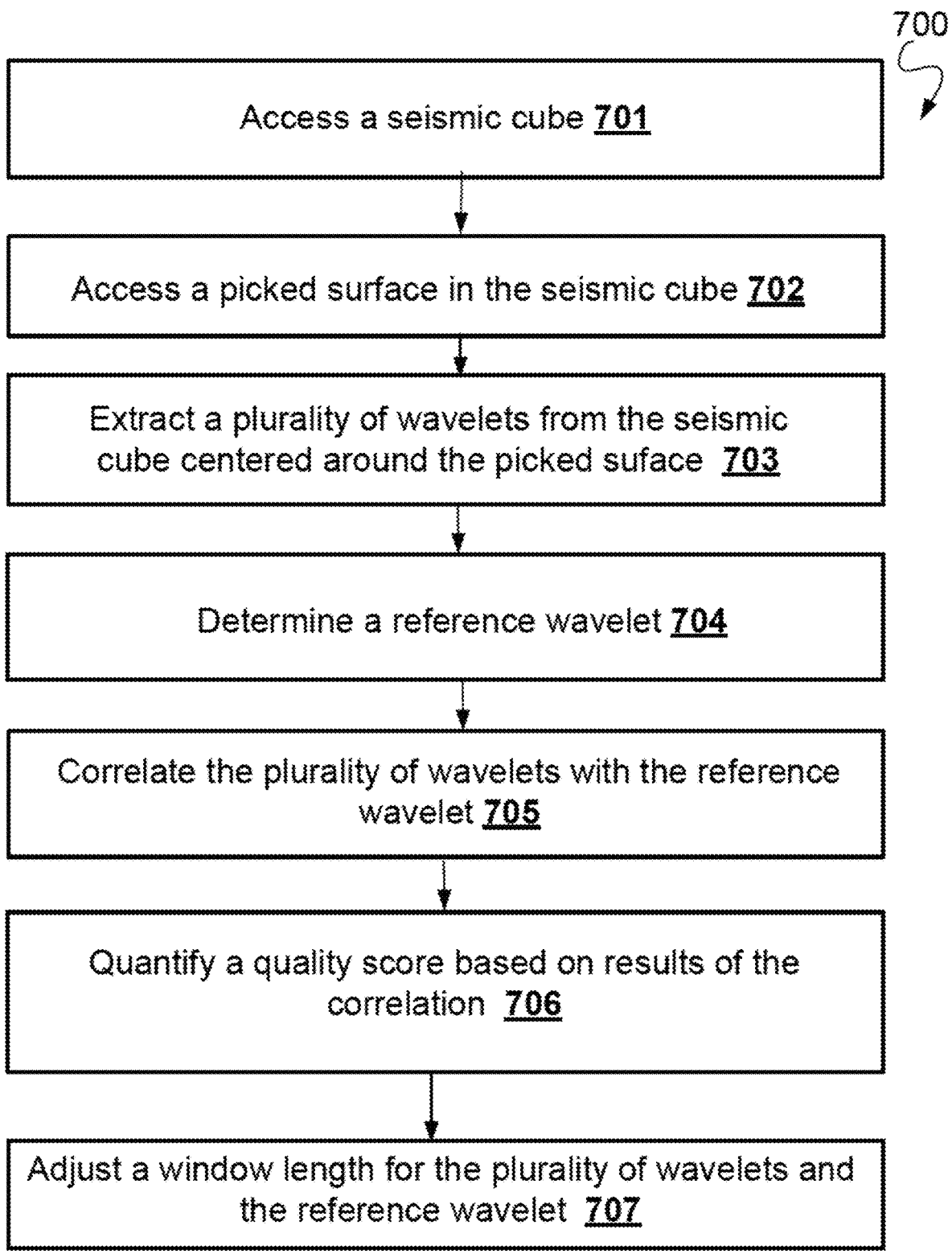
FIG. 7 is an example of a flow chart according to an implementation of the present disclosure.

As illustrated by the flow chart 700 of FIG. 7, an implementation may start with obtaining access to a seismic cube (701). The seismic cube can include a set of seismic data traces, each recording seismic signals reflected from underneath the ground with in an area. The seismic data traces can be recorded from a grid of locations inside the area. The implementation may also obtain access to a picked surface in the seismic cube (702). A surface, also known as a horizon in geophysics parlance, can refer to an imaginary layer underneath the ground. The surface may be picked, for example, by algorithms such as an auto-tracking algorithm. Some implementations may import multiple picked surfaces to iteratively improve, for example, the auto-tracking algorithm, or to compare the strength of different algorithms to generate picked surfaces with better consistencies.

Figure 3:
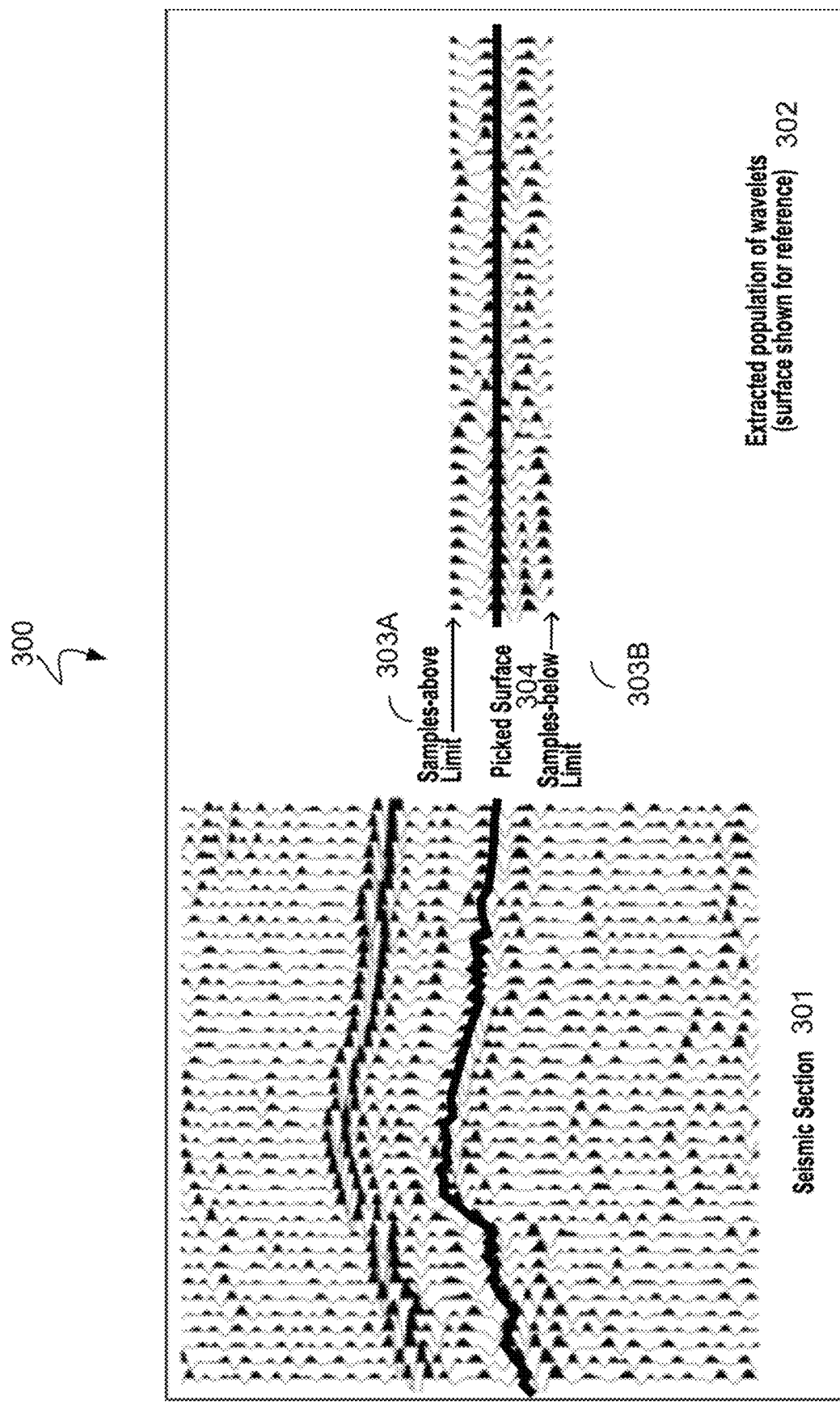
FIG. 3 shows an example of extracting wavelets around the picked surface from seismic data according to an implementation of the present disclosure.

Next, the implementations may extract a plurality of wavelets from the seismic cube (703). As illustrated in FIGS. 1, 2A, and 3, the extracted wavelets may be centered on the picked surface and may cover an adjustable length. The implementation may then determine a reference wavelet for the plurality of extracted wavelets in the seismic cube (704), as illustrated in FIGS. 1 and 2B. Based on the plurality of extracted wavelets and the reference wavelet, the implementation may then perform a correlation (705), as illustrated by the cross-correlation in FIG. 2C.

Thereafter, the implementations may quantify a quality score based on results of the correlation (706). Based on the quality score, the implementation can further adjust the window length for the extracted wavelets and the reference wavelet (707). The implementation can result in a singular score for assessing and quantifying the quality of seismic surfaces. As illustrated in FIG. 2C, the singular score can be from to 100%. The computation can be performed without manually checking the surface. Here, zero means the surface is not consistent with the seismic cube while 100% means the surface is in ideal agreement with the seismic cube. In most cases, the implementations expect to yield a score in between. Being able to measure the quality of surfaces is advantageous in seismic exploration for hydrocarbons. This quantitative aspect enables automatic and quick assessment and comparisons of interpreted surfaces or different versions of the same surface. The quantification also enables assessing and quantifying the degree of conformity between two surfaces at two geological ages. The quantification also provides several data management advantages when run on a repository of cubes and surfaces. In addition, the ability to quantify the quality of interpreted surfaces can enable Artificial Intelligence (AI) algorithms to improve upon themselves later by providing feedback so that the AI algorithms can be trained to optimize the quality measure. In addition to the quality measure, the implementation can also output the wavelength at the best quality.

Implementations can assess the quality of a picked surface. The implementations can also compare different version of picked surfaces to each other, or compare one surface to different versions of the seismic cube. The implementations can automatically assess and quantify the quality of surfaces with a global score. By assigning a unique, parameter free, and global quality score to surfaces, the implementations defines a unique measure for maximum global quality based on which an automated algorithm can programmatically evaluate the quality of a picked surface. Implementations can also evaluate and quantify the degree of conformity between two seismic surfaces or events at two geological ages. The implementations can serve as a data management tool to automatically associate surfaces with cubes and assign quality to each surface. Implementations can further incorporate optimization algorithms to improve the surface programmatically without human intervention using, for example, an AI (or machine learning or dynamic programming) algorithm to pick a surface that leads to an optimized quality score.

The implementations incorporate global population methods in which each wavelet trace is compared to a global reference and the locations of the traces may not be significant. The implementations may examine the consistency of the population. The implementations may not need user input to specify the parameters for the quantification. Indeed, the quantification is parameter free. This feature is in stark contrast with known prior art.

Figure 8:
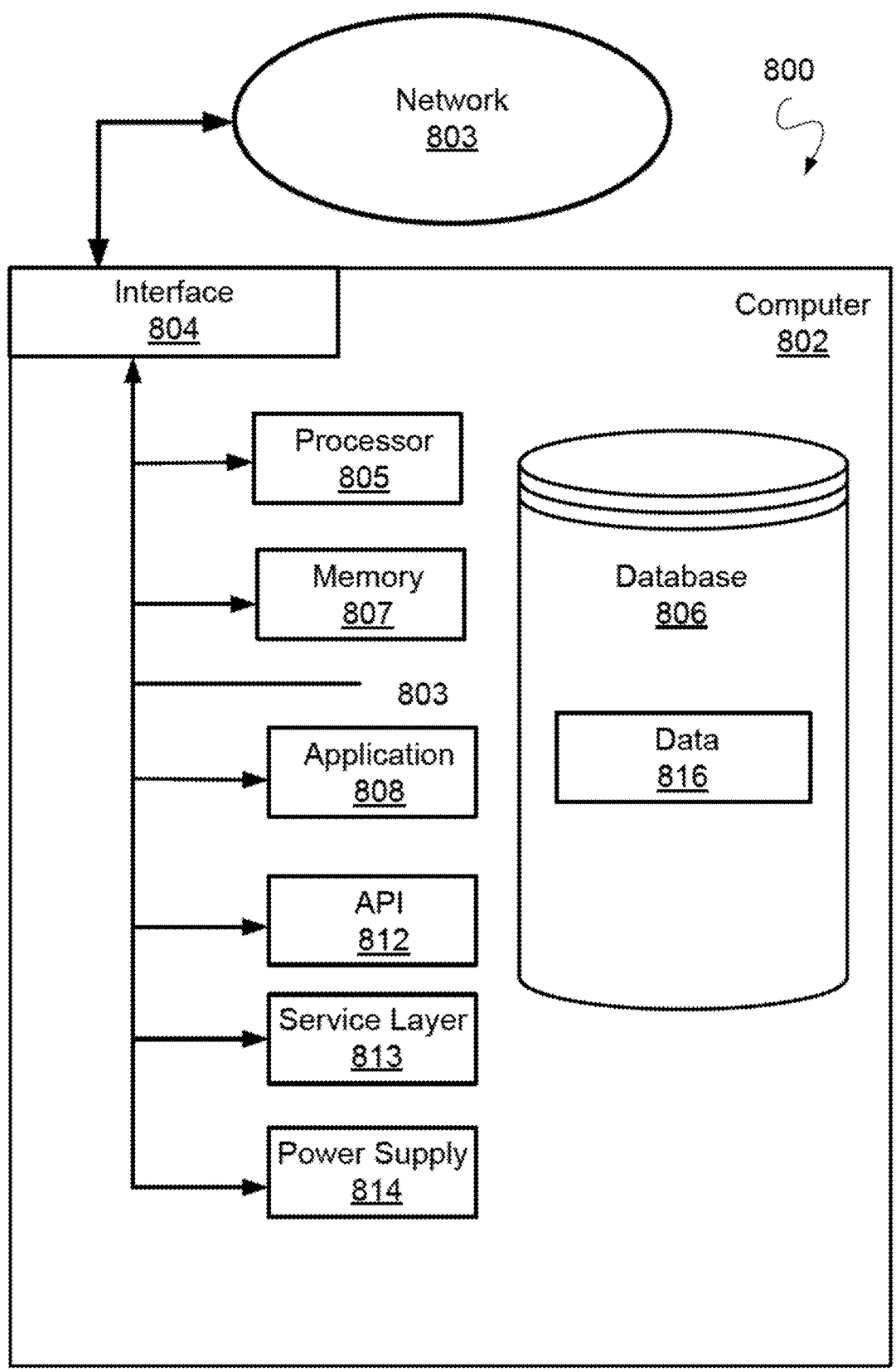
FIG. 8 is a block diagram illustrating an example of a computer system used to provide computational functionalities associated with described algorithms, methods, functions, processes, flows, and procedures, according to an implementation of the present disclosure.

FIG. 8 is a block diagram illustrating an example of a computer system 800 used to provide computational functionalities associated with described algorithms, methods, functions, processes, flows, and procedures, according to an implementation of the present disclosure. The illustrated computer 802 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 802 can comprise a computer that includes an input device, such as a keypad, keyboard, touch screen, another input device, or a combination of input devices that can accept user information, and an output device that conveys information associated with the operation of the computer 802, including digital data, visual, audio, another type of information, or a combination of types of information, on a graphical-type user interface (UI) (or GUI) or other UI.

The computer 802 can serve in a role in a computer system as a client, network component, a server, a database or another persistency, another role, or a combination of roles for performing the subject matter described in the present disclosure. The illustrated computer 802 is communicably coupled with a network 803. In some implementations, one or more components of the computer 802 can be configured to operate within an environment, including cloud-computing-based, local, global, another environment, or a combination of environments.

The computer 802 is an electronic computing device operable to receive, transmit, process, store, or manage data and information associated with the described subject matter. According to some implementations, the computer 802 can also include or be communicably coupled with a server, including an application server, e-mail server, web server, caching server, streaming data server, another server, or a combination of servers.

The computer 802 can receive requests over network 803 (for example, from a client software application executing on another computer 802) and respond to the received requests by processing the received requests using a software application or a combination of software applications. In addition, requests can also be sent to the computer 802 from internal users, external or third-parties, or other entities, individuals, systems, or computers.

Each of the components of the computer 802 can communicate using a network 803 (or system bus). In some implementations, any or all of the components of the computer 802, including hardware, software, or a combination of hardware and software, can interface over the network 803 (or system bus) using an application programming interface (API) 812, a service layer 813, or a combination of the API 812 and service layer 813. The API 812 can include specifications for routines, data structures, and object classes. The API 812 can be either computer-language independent or dependent and refer to a complete interface, a single function, or even a set of APIs. The service layer 813 provides software services to the computer 802 or other components (whether illustrated or not) that are communicably coupled to the computer 802. The functionality of the computer 802 can be accessible for all service consumers using this service layer. Software services, such as those provided by the service layer 813, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 802, alternative implementations can illustrate the API 812 or the service layer 813 as stand-alone components in relation to other components of the computer 802 or other components (whether illustrated or not) that are communicably coupled to the computer 802. Moreover, any or all parts of the API 812 or the service layer 813 can be implemented as a child or a sub-module of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802. The interface 804 is used by the computer 802 for communicating with another computing system (whether illustrated or not) that is communicatively linked to the network 803 in a distributed environment. Generally, the interface 804 is operable to communicate with the network 803 and comprises logic encoded in software, hardware, or a combination of software and hardware. More specifically, the interface 804 can comprise software supporting one or more communication protocols associated with communications such that the network 803 or interface's hardware is operable to communicate physical signals within and outside of the illustrated computer 802.

The computer 802 includes a processor 805. Although illustrated as a single processor 805 in FIG. 8, two or more processors can be used according to particular needs, desires, or particular implementations of the computer 802. Generally, the processor 805 executes instructions and manipulates data to perform the operations of the computer 802 and any algorithms, methods, functions, processes, flows, and procedures as described in the present disclosure.

The computer 802 also includes a database 806 that can hold data for the computer 802, another component communicatively linked to the network 803 (whether illustrated or not), or a combination of the computer 802 and another component. For example, database 806 can be an in-memory, conventional, or another type of database storing data consistent with the present disclosure. In some implementations, database 806 can be a combination of two or more different database types (for example, a hybrid in-memory and conventional database) according to particular needs, desires, or particular implementations of the computer 802 and the described functionality. Although illustrated as a single database 806 in FIG. 8, two or more databases of similar or differing types can be used according to particular needs, desires, or particular implementations of the computer 802 and the described functionality. While database 806 is illustrated as an integral component of the computer 802, in alternative implementations, database 806 can be external to the computer 802. As illustrated, the database 806 holds the previously described data 816 including, for example, multiple streams of data from various sources, such as seismic data in the form of a seismic cube, as shown in FIG. 1.

The computer 802 also includes a memory 807 that can hold data for the computer 802, another component or components communicatively linked to the network 803 (whether illustrated or not), or a combination of the computer 802 and another component. Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 or similar or differing types can be used according to particular needs, desires, or particular implementations of the computer 802 and the described functionality. While memory 807 is illustrated as an integral component of the computer 802, in alternative implementations, memory 807 can be external to the computer 802.

The application 808 is an algorithmic software engine providing functionality according to particular needs, desires, or particular implementations of the computer 802, particularly with respect to functionality described in the present disclosure. For example, application 808 can serve as one or more components, modules, or applications. Further, although illustrated as a single application 808, the application 808 can be implemented as multiple applications 808 on the computer 802. In addition, although illustrated as integral to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion or management circuits (including recharging, standby, or another power management functionality). In some implementations, the power-supply 814 can include a power plug to allow the computer 802 to be plugged into a wall socket or another power source to, for example, power the computer 802 or recharge a rechargeable battery.

There can be any number of computers 802 associated with, or external to, a computer system containing computer 802, each computer 802 communicating over network 803. Further, the term "client," "user," or other appropriate terminology can be used interchangeably, as appropriate, without departing from the scope of the present disclosure. Moreover, the present disclosure contemplates that many users can use one computer 802, or that one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   accessing a set of seismic traces from a grid of locations inside an geo-exploration area, each seismic trace records seismic reflections from underneath the geo-exploration area at a location of the grid;
   accessing an input surface indicating more than one stratigraphic surfaces in the set of seismic traces;
   extracting a plurality of wavelets from the set of seismic traces, each wavelet covering an variable length around the input surface of a corresponding seismic trace;
   determining a reference wavelet for each wavelet of a corresponding variable length;
   quantifying a respective quality of each of the more than one stratigraphic surfaces based on correlating the plurality of wavelets with each reference wavelet of the corresponding variable length;
   ranking the more than one stratigraphic surfaces based on the respective quality of each of the more than one stratigraphic surface surfaces; and
   based on the ranked more than one stratigraphic surfaces, providing a feedback to a selection process for the more than one stratigraphic surfaces such that the selection process is iteratively improved based on the feedback, wherein the selection process includes at least one of: an artificial intelligence (AI) algorithm, a machine learning (ML) algorithm, or a dynamic programming algorithm, and wherein when a quality of a first stratigraphic surface is compared with a quality of a second stratigraphic surface that is deeper than the first stratigraphic surface, a conformity of the first stratigraphic surface and the second stratigraphic surface is automatically determined, thereby estimating geological activities happening between when the first stratigraphic surface is deposited and when the second stratigraphic surface is deposited.

2. The computer-implemented method of claim 1, wherein quantifying a quality of a respective stratigraphic surface comprises:

for each variable length, computing a cross-correlation between the plurality of wavelets and each reference wavelet; and determining the quality of the respective stratigraphic surface based on selecting a representative value from cross-correlations computed for a range of variable lengths.

3. The computer-implemented method of claim 2, wherein selecting a representative value comprises: selecting a maximum of the cross-correlations computed for the range of variable lengths.

4. The computer-implemented method of claim 2, further comprising:

identifying a size of the variable length where the representative value occurs.

5. The computer-implemented method of claim 4, further comprising:

adjusting the variable length between a lower limit and an upper limit while quantifying the quality of the respective stratigraphic surface, wherein the identified size of the variable length is within the lower limit and the upper limit.

6. A computer system comprising one or more computer processors configured to perform operations of:

accessing a set of seismic traces from a grid of locations inside an geo-exploration area, each seismic trace records seismic reflections from underneath the geo-exploration area at a location of the grid;

accessing an input surface indicating more than one stratigraphic surfaces indicating a surface in the set of seismic traces;

extracting a plurality of wavelets from the set of seismic traces, each wavelet covering an variable length around the input surface of a corresponding seismic trace;

determining a reference wavelet for each wavelet of a corresponding variable length;

quantifying a respective quality of each of the more than one stratigraphic surfaces surface based on correlating the plurality of wavelets with each reference wavelet of the corresponding variable length;

ranking the more than one stratigraphic surfaces based on the respective quality of each of the more than one stratigraphic surface surfaces; and based on the ranked more than one stratigraphic surfaces, providing a feedback to a selection process for the more than one stratigraphic surfaces such that the selection process is iteratively improved based on the feedback, wherein the selection process includes at least one of: an artificial intelligence (AI) algorithm, a machine learning (ML) algorithm, or a dynamic programming algorithm, and wherein when a quality of a first stratigraphic surface is compared with a quality of a second stratigraphic surface that is deeper than the first stratigraphic surface, a conformity of the first stratigraphic surface and the second stratigraphic surface is automatically determined, thereby estimating geological activities happening between when the first stratigraphic surface is deposited and when the second stratigraphic surface is deposited.

7. The computer system of claim 6, wherein quantifying a quality of a respective stratigraphic surface comprises:

for each variable length, computing a cross-correlation between the plurality of wavelets and each reference wavelet; and determining the quality of the respective stratigraphic surface based on selecting a representative value from cross-correlations computed for a range of variable lengths.

8. The computer system of claim 7, wherein selecting a representative value comprises: selecting a maximum of the cross-correlations computed for the range of variable lengths.

9. The computer system of claim 7, wherein the operations further comprise:

identifying a size of the variable length where the representative value occurs.

10. The computer system of claim 9, wherein the operations further comprise:

adjusting the variable length between a lower limit and an upper limit while quantifying the quality of the respective stratigraphic surface, wherein the identified size of the variable length is within the lower limit and the upper limit.

11. A non-transitory computer-readable medium comprising software instructions, which software instructions, when executed by a computer processor, causes the computer processor to perform operations of:

accessing a set of seismic traces from a grid of locations inside an geo-exploration area, each seismic trace records seismic reflections from underneath the geo-exploration area at a location of the grid;

accessing an input surface indicating more than one stratigraphic surfaces in the set of seismic traces;

extracting a plurality of wavelets from the set of seismic traces, each wavelet covering an variable length around the input surface of a corresponding seismic trace;

determining a reference wavelet for each wavelet of a corresponding variable length;

quantifying a respective quality of each of the more than one stratigraphic surfaces based on correlating the plurality of wavelets with each reference wavelet of the corresponding variable length;

ranking the more than one stratigraphic surfaces based on the respective quality of each of the more than one stratigraphic surface surfaces; and based on the ranked more than one stratigraphic surfaces, providing a feedback to a selection process for the more than one stratigraphic surfaces such that the selection process is iteratively improved based on the feedback, wherein the selection process includes at least one of: an artificial intelligence (AI) algorithm, a machine learning (ML) algorithm, or a dynamic programming algorithm, and wherein when a quality of a first stratigraphic surface is compared with a quality of a second stratigraphic surface that is deeper than the first stratigraphic surface, a conformity of the first stratigraphic surface and the second stratigraphic surface is automatically determined, thereby estimating geological activities happening between when the first stratigraphic surface is deposited and when the second stratigraphic surface is deposited.

12. The non-transitory computer-readable medium of claim 11, wherein quantifying a quality of a respective stratigraphic surface comprises:

for each variable length, computing a cross-correlation between the plurality of wavelets and each reference wavelet; and determining the quality of the respective stratigraphic surface based on selecting a representative value from cross-correlations computed for a range of variable lengths.

13. The non-transitory computer-readable medium of claim 12, wherein selecting a representative value comprises: selecting a maximum of the cross-correlations computed for the range of variable lengths.

14. The non-transitory computer-readable medium of claim 12, wherein the operations further comprise:
identifying a size of the variable length where the representative value occurs.

15. The non-transitory computer-readable medium of claim 14, wherein the operations further comprise:
adjusting the variable length between a lower limit and an upper limit while quantifying the quality of the respective stratigraphic surface, wherein the identified size of the variable length is within the lower limit and the upper limit.

* * * * *

UNITED STATES PATENT AND TRADEMARK OFFICE
CERTIFICATE OF CORRECTION

| | | |
|---|---|---|
| PATENT NO. | : 11,754,737 B2 | Page 1 of 1 |
| APPLICATION NO. | : 17/197558 | |
| DATED | : September 12, 2023 | |
| INVENTOR(S) | : Sami N. Awfi | |

It is certified that error appears in the above-identified patent and that said Letters Patent is hereby corrected as shown below:

In the Claims

In Column 16, Line 48, Claim 1, please replace "surface surfaces;" with -- surfaces; --.
In Column 17, Line 40, Claim 6, please replace "surfaces surface" with -- surfaces --.
In Column 17, Line 45, Claim 6, please replace "surface surfaces;" with -- surfaces; --.
In Column 18, Line 44, Claim 11, please replace "surface surfaces;" with -- surfaces; --.

Signed and Sealed this
Thirtieth Day of January, 2024

Katherine Kelly Vidal
*Director of the United States Patent and Trademark Office*